US012627251B2

(12) United States Patent
Seccia et al.

(10) Patent No.: US 12,627,251 B2
(45) Date of Patent: May 12, 2026

(54) METHOD FOR ESTIMATING THE MAGNET TEMPERATURE IN AN ELECTRICAL MACHINE, METHOD FOR CONTROLLING SAID ELECTRICAL MACHINE, ELECTRONIC DEVICE FOR ESTIMATING THE MAGNET TEMPERATURE IN AN ELECTRICAL MACHINE AND SYSTEM FOR CONTROLLING SAID ELECTRICAL MACHINE

(71) Applicant: ELDOR CORPORATION S.P.A., Orsenigo (IT)

(72) Inventors: Ruggero Seccia, Orsenigo (IT); Luca Zai, Orsenigo (IT); Pasquale Forte, Orsenigo (IT)

(73) Assignee: ELDOR CORPORATION S.p.A., Orsenigo (IT)

( * ) Notice: Subject to any disclaimer, the term of this patent is extended or adjusted under 35 U.S.C. 154(b) by 89 days.

(21) Appl. No.: 18/561,476

(22) PCT Filed: May 13, 2022

(86) PCT No.: PCT/IB2022/054462
§ 371 (c)(1),
(2) Date: Nov. 16, 2023

(87) PCT Pub. No.: WO2022/243812
PCT Pub. Date: Nov. 24, 2022

(65) Prior Publication Data
US 2024/0258953 A1 Aug. 1, 2024

(30) Foreign Application Priority Data
May 17, 2021 (IT) ........................ 102021000012575

(51) Int. Cl.
*H02P 21/13* (2006.01)
*H02P 21/14* (2016.01)
(Continued)

(52) U.S. Cl.
CPC ............ *H02P 29/60* (2016.02); *H02P 21/141* (2013.01)

(58) Field of Classification Search
CPC ...... H02P 23/14; H02P 21/141; H02P 29/662; H02P 29/60; H02P 21/13
(Continued)

(56) References Cited

U.S. PATENT DOCUMENTS 7,979,171 B2    7/2011  Wu
2004/0007997 A1  1/2004  Fu
(Continued)

FOREIGN PATENT DOCUMENTS

JP    2004222387 A    8/2004
JP    2021016226 A    2/2021

OTHER PUBLICATIONS

English_Machine_Translation_JP2021016226 A (Year: 2021).*
International Search Report dated Aug. 4, 2022 from counterpart PCT App No. PCT/IB2022/054462.

*Primary Examiner* — Gabriel Agared

(57) ABSTRACT

A method for estimating the magnet temperature in an electrical machine carried out by means of an electronic computer involves estimating a value of a total magnetic flux of the electrical machine and estimating a value of a first partial flux, representing a magnetic flux due to a reluctance of the electrical machine. The method also involves the steps of calculating a value of a second partial flux as a function of a difference between said value of the total magnetic flux (Continued)

and said value of the first partial flux and determining a value of a magnet temperature as a function of said value of the second partial flux.

15 Claims, 1 Drawing Sheet

(51) Int. Cl.
*H02P 23/14* (2006.01)
*H02P 29/60* (2016.01)

(58) Field of Classification Search
USPC ........................................................ 318/471
See application file for complete search history.

(56) References Cited

U.S. PATENT DOCUMENTS

| 2015/0357954 | A1* | 12/2015 | Kim ........................ H02P 29/60 |
| | | | 318/400.02 |
| 2017/0126167 | A1* | 5/2017 | Simili ..................... H02P 29/64 |
| 2020/0036311 | A1 | 1/2020 | Freire |
| 2020/0119680 | A1* | 4/2020 | Yoo ........................... H02P 6/28 |
| 2021/0067075 | A1* | 3/2021 | Berry ..................... B60L 15/20 |
| 2021/0197839 | A1* | 7/2021 | Shabestari ............. H02P 21/06 |
| 2021/0234496 | A1* | 7/2021 | Seo ....................... H02P 29/662 |

* cited by examiner

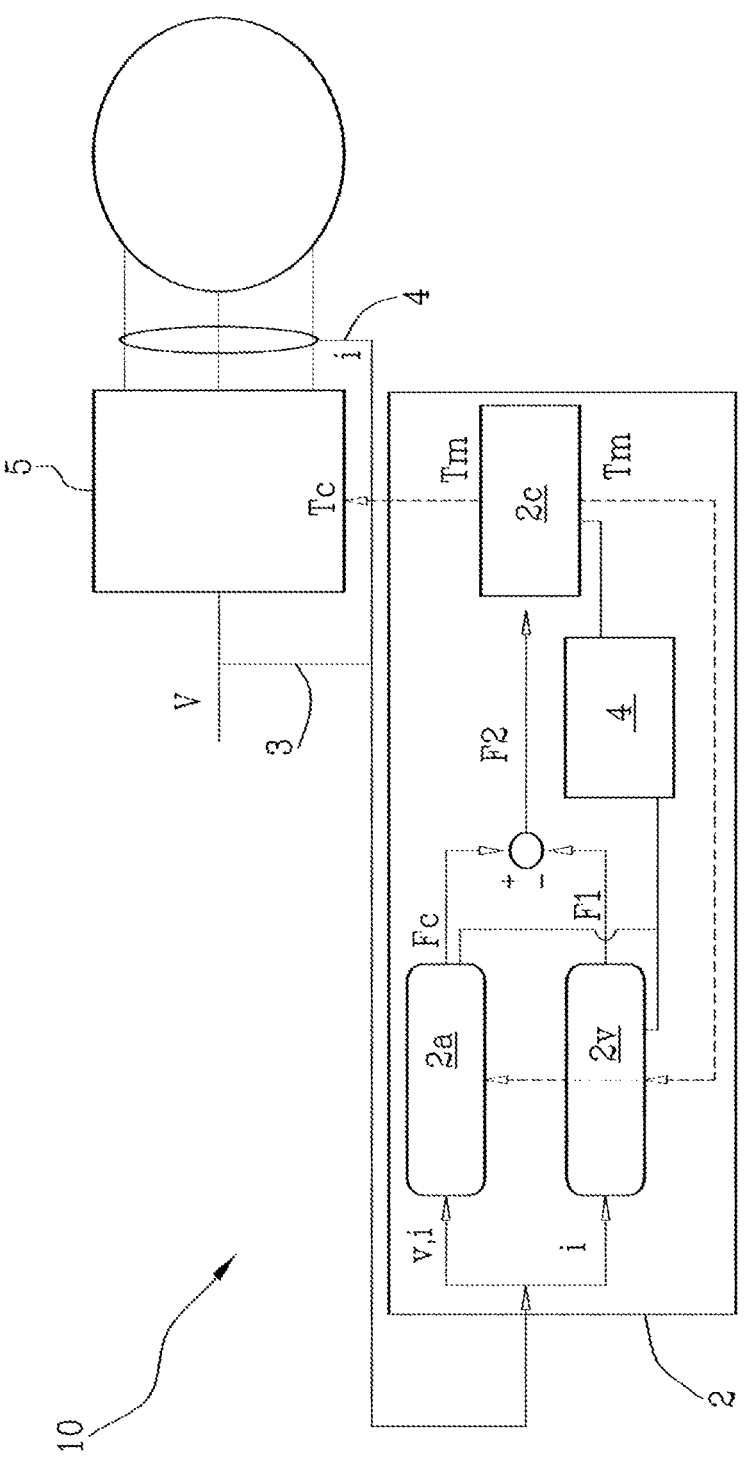

1

METHOD FOR ESTIMATING THE MAGNET TEMPERATURE IN AN ELECTRICAL MACHINE, METHOD FOR CONTROLLING SAID ELECTRICAL MACHINE, ELECTRONIC DEVICE FOR ESTIMATING THE MAGNET TEMPERATURE IN AN ELECTRICAL MACHINE AND SYSTEM FOR CONTROLLING SAID ELECTRICAL MACHINE

This application is the National Phase of International Application PCT/IB2022/054462 filed May 13, 2022 which designated the U.S.

This application claims priority to Italian Patent Application No. 102021000012575 filed May 17, 2021, which applications are incorporated by reference herein.

This invention relates to a method for estimating the magnet temperature in an electrical machine and to a method for controlling said electrical machine.

In addition, this invention also relates to an electronic device for estimating the magnet temperature in an electrical machine and to a system for controlling said electrical machine.

This invention has its main application in the area of electric or hybrid traction, in particular in the automotive sector, in the design and construction of hybrid or electric drive systems.

Of the main parameters that are the subject of analysis in the control of an electrical machine, the magnet temperature is one of those that, while having a significant impact in the efficiency of the machine, are more complex to use, since difficult to measure directly.

The absence of correct information relating to this parameter, in fact, may lead both to a reduction in performance and to energy consumption or safety problems.

In terms of safety, in particular, a control based on an incorrect magnet temperature may entail:

the exceeding of limit electric values;

a loss of control, in the event of operation at the limits of the battery voltage;

problems of demagnetisation of the magnet itself, due to exceeding its limit operating temperature.

For this reason, in the prior art, numerous methods or systems for detecting or estimating the magnet temperature have been developed; these are briefly illustrated below.

A first known solution consists in estimating methods based on equivalent thermal models that, in any case, are rather onerous in terms of computation and difficult to calibrate, since they require a thorough knowledge both of the thermal parameters and of the electric ones of the machine. This substantially limits the use thereof on a large scale.

Alternatively, it is possible to estimate the magnet temperature by measuring the open-circuit voltage, as illustrated in the U.S. Pat. No. 7,979,171, which, in any case, needs de-energising of the machine during its normal operation, so that it is mainly suitable for bank applications.

Solutions using temperature sensors inserted directly in the magnet, with transmission of data through the collector or in wireless mode, are also known, as described in the patent US20040007997.

Disadvantageously, in any case, the presence of sensors negatively impacts the machine both in terms of cost and structure, since the machine parameters and shape are altered.

Among the solutions known today, there are also methods that involve correlating the estimate of the temperature to the magnetic flux of the machine (US20200036311), which, in any case, entails an estimate that is not very accurate since it does not consider the different contributions determining the machine's total flux.

The purpose of this invention is, thus, to provide an electronic device for estimating the magnet temperature in an electrical machine, a system for controlling said electrical machine, a method for estimating the magnet temperature in an electrical machine, and a method for controlling said electrical machine that can overcome the drawbacks of the prior art noted above.

In particular, the purpose of this invention is to provide a method for estimating the magnet temperature in an electrical machine that is reliable and, at the same time, computationally simple.

An additional purpose of this invention is to provide a method for controlling an electrical machine that is efficient and, at the same time, safe.

Again, the purposes of this invention include providing an electronic device for estimating the magnet temperature in an electrical machine and a control system for said electrical machine that are reliable and, at the same time, economical.

Said purposes are achieved with an electronic device for estimating the magnet temperature in an electrical machine, a system for controlling said electrical machine, a method for estimating the magnet temperature in an electrical machine, and a method for controlling said electrical machine having the features of one or more of the claims below.

In particular, said purposes are achieved with an electronic device for estimating the magnet temperature in an electrical machine, comprising a processing unit configured to:

a) estimate a value of a total magnetic flux of the electrical machine;

b) estimate a value of a first partial flux, representing a magnetic flux due to a reluctance of the electrical machine;

c) calculate a value of a second partial flux as a function of a difference between said value of the total magnetic flux and said value of the first partial flux;

d) determine a value of a magnet temperature as a function of said value of the second partial flux.

In other words, the electronic device is configured to estimate both the total flux of the machine and a first "partial" flux, uniquely correlated to the reluctance of the machine, obtaining, by the difference between the two, a value of a second partial flux, actually correlated to the magnet temperature.

In this way, it is possible, without the aid of sensors and simply by monitoring the machine in use, to determine what contribution of the total magnetic flux is directly correlated to the magnet temperature and to obtain, by inversion, the temperature value.

It should be noted that the term "total magnetic flux" is intended to define, in this text, the total magnetic flux generated by the electrical machine, which takes into account both the stator contribution (current circulating in the windings) and the rotor contribution (permanent magnets).

In accordance with this, the expression "first partial flux" defines, instead, the share of the total magnetic flux determined solely by the stator contribution, thus by the current flowing in the windings, and by the particular rotor shape, otherwise defined as reluctance flux.

The expression "second partial flux" instead represents the share of the total magnetic flux determined by the magnetic fields generated by the permanent magnets anchored to the rotor.

It should be noted that, preferably, both the estimate of the total magnetic flux value and that of the first partial flux are carried out by reference to a specific reference temperature determined before the estimate.

Advantageously, thanks to the device according to the invention, it is possible:

e) to continuously update the value of the reference temperature, replacing the predetermined one with the magnet temperature value determined at point d).

In this regard, the processing unit is preferably configured to recursively perform the steps from point a) to point e), obtaining a rapid convergence of the temperature value with the actual one.

The device is, thus, quick and, at the same time, robust, operating repeatedly in order to increasingly approach the current operating temperature.

Also, the subject of this invention, and complementary or alternative to what has been described above, is a system for controlling an electrical machine.

This system comprises an electronic device for estimating the magnet temperature in accordance with what has been described above and a control device for the electrical machine connected to it.

The control device is configured to send a control signal to the electrical machine according to a control voltage and a value of a current temperature of said electrical machine.

The electronic device is, thus, configured to determine the magnet temperature in accordance with steps a)-d) described above and to update the value of said current temperature, replacing it with the value of said magnet temperature determined at step d).

Advantageously, in this way it is possible to exploit the device for estimating the temperature in order to optimise the control and efficiency of the electrical machine, which will, thus, be constantly controlled and monitored with reference to the correct operating temperature, to the advantage both of performance and safety.

The subject of this invention is also a method for estimating the magnet temperature in an electrical machine constructed using an electronic computer.

The method involves:

A) estimating a value of a total magnetic flux of the electrical machine;

B) estimating a value of a first partial flux, representing a magnetic flux due to a reluctance of the electrical machine;

C) calculating a value of a second partial flux as a function of a difference between said value of the total magnetic flux and said value of the first partial flux;

D) determining a value of a magnet temperature as a function of said value of the second partial flux.

Advantageously, in accordance with what is stated above, this method makes it possible to quickly converge with the actual temperature value, thanks to the "discrimination" between the various flux contributions, identifying that (value of the second partial flux) directly linked to the magnet temperature.

A preliminary step for determining a value of a reference magnet temperature is also, preferably, included, wherein steps A) and B) are performed by estimating said value of the total magnetic flux and said value of the first partial flux with reference to said value of the reference magnet temperature.

In addition, steps A) to D) are preferably carried out recursively so as to converge on the actual operating temperature in a limited number of repetitions.

In this respect, it should be noted that, preferably, the method involves detecting or determining a first quantity representing a control voltage and a second quantity representing the current circulating in the stator windings of the electrical machine.

The estimate of the value of the total magnetic flux is preferably carried out at least in part as a function of said first quantity representing the control voltage.

The estimate of the value of the first partial flux is preferably carried out at as a function of said second quantity, representing the circulating current detected.

Alternatively, the total magnetic flux and the first partial flux could be estimated as a function of other quantities and/or by inverting the input quantities (e.g., the total magnetic flux estimated as a function of the second quantity and the first partial flux estimated as a function of the first quantity).

In this way, the inputs of the two processes for estimating the value of the total flux and the value of the first partial flux are in part different, determining an error that gradually diminishes with the approximation of the correct value of the magnet temperature, making the method very reliable and robust without needing a thorough knowledge of the machine model.

An additional subject of this invention is a method for controlling an electrical machine, comprising the steps of:

determining a value of a current temperature of an electrical machine;

determining a value of a first quantity representing the control voltage of said electrical machine;

generating a control signal of said electrical machine according to said value of said first quantity and of said value of the current temperature.

The value of the magnet temperature of the electrical machine is then estimated, in accordance with steps A)-D) as described above.

At this point, the value of the current temperature is updated, replacing it with the value of said magnet temperature determined at step D), so as to optimise the machine's control parameters with respect to the operating temperature.

The dependent claims, incorporated herein for reference, correspond to different embodiments of the invention.

Additional characteristics and advantages of this invention will be clearer from the indicative, and therefore non-limiting, description of a preferred but not exclusive embodiment of an electronic device for estimating the magnet temperature in an electrical machine, a system for controlling said electrical machine, a method for estimating the magnet temperature in an electrical machine, and a method for controlling said electrical machine, as illustrated in the attached drawings in which:

FIG. 1 schematically shows a control diagram of the electrical machine in accordance with the method that is the subject of the invention.

With reference to the attached FIGURES, reference number 1 generically identifies an electronic device for estimating the magnet temperature in an electrical machine EM according to this invention.

The electronic device 1, preferably a chip or a microcontroller, preferably finds application in the control of permanent magnet electrical machines with the purpose of precisely estimating the current temperature thereof, information that is useful, for example, for optimising control methods.

This electronic device 1 comprises a processing unit 2 configured to:

a) estimate a value of a total magnetic flux Fc of the electrical machine EM;

b) estimate a value of a first partial flux F1 representing a magnetic flux due to a reluctance of the electrical machine EM.

In one embodiment, then, the processing unit 2 comprises an estimation module 2*a* for the total magnetic flux Fc configured to determine the value of the total magnetic flux Fc as a function of one or more input parameters.

Said parameters preferably comprise at least a first quantity representing a control voltage of the electrical machine EM and at least one second quantity representing a current circulating in the stator windings of the electrical machine EM.

In this respect, the electronic device 1 (or processing unit 2) comprises a first detection element of a first quantity "v" representing a control voltage of an electrical machine EM and a second detection element of a second quantity "i" representing a current circulating in the stator windings of said electrical machine EM.

Said estimation module 2*a* is preferably defined by a known flux observer, for example from the publication "*Unified Direct-Flux Vector Control for AC Motor Drives*"—Gianmario Pellegrino, Radu Iustin Bojoi and Paolo Guglielmi.

Alternatively, the processing unit 2 could be arranged to receive, as input, a signal representing the total magnetic flux, housed, for example, in a processor external to the electronic device 1.

According to one aspect of the invention, the processing unit 2 thus comprises an estimation module 2*b* of the first partial flux F1.

This first partial flux F1, as mentioned, represents a magnetic flux due to a reluctance of the electrical machine EM.

In other words, the first partial flux represents the share of the total magnetic flux determined solely by the stator contribution, thus by the current flowing in the windings, and by the particular rotor shape, otherwise defined reluctance flux.

The estimation module 2*b* of the first partial flux F1 is preferably configured to determine the value of the first partial flux F1 as a function of one or more input parameters. These parameters preferably comprise the second quantity "i" representing the current circulating in the stator windings of the electrical machine EM.

The estimation module 2*b* is, therefore, connected to the second detection element.

Thus, the estimation module 2*a* of the total magnetic flux Fc is, preferably, configured to estimate the value of the total magnetic flux Fc at least in part as a function of the first quantity "v", while the estimation module 2*b* of the first partial flux F1 is configured to estimate the value of the first partial flux F1 as a function of the second quantity "i".

The total magnetic flux is preferably estimated as a function both of the first "v" and the second quantity "i".

Alternatively, the total magnetic flux and the first partial flux could be estimated as a function of other quantities and/or by inverting the input quantities (e.g., the total magnetic flux estimated as a function of the second quantity and the first partial flux estimated as a function of the first quantity). In the preferred embodiment, the processing unit

2 is also configured to determine in advance a value of a reference magnet temperature Tr and to estimate the value of the total magnetic flux Fc and the value of the first partial flux F1 with reference to said value of the reference magnet temperature Tr.

In other words, the estimation module 2*a* of the total magnetic flux Fc is preferably configured to estimate the value of the total magnetic flux Fc as a function of the first quantity "v" and of the reference magnet temperature Tr.

More preferably, the estimation module 2*a* of the total magnetic flux Fc is preferably configured to estimate the value of the total magnetic flux Fc as a function of the first quantity "v", of the second quantity "i", and of the reference magnet temperature Tr.

Similarly, the estimation module 2*b* of the first partial flux F1 is configured to estimate the value of the first partial flux F1 as a function of the second quantity "i" and of the reference magnet temperature Tr.

The two values of the total magnetic flux Fc and of the first partial flux F1 are preferably determined beginning from "flux maps", which the processing unit 2 can access.

More specifically, the device 1 preferably comprises a memory unit 4 in which the following are stored:

a number of first maps relating the value of the total magnetic flux Fc to a specific magnet temperature;

a number of second maps relating the value of the first partial flux F1 to a specific magnet temperature.

More precisely, each first or second map makes it possible to identify a corresponding flux value (total or partial) at a determined magnet temperature as one or more input parameters, preferably defined by the first and/or by the second quantity, possibly suitably broken down into respective vector quantities, change.

It should be noted that the first and second maps preferably refer to a specific temperature value, but could also represent a temperature range.

These maps are, preferably, formed in pre-processing, for example experimentally, and enable the precise modelling of the behaviour of the electrical machine EM.

In the preferred embodiment, the first estimation module 2*a* is configured to determine at least two known total magnetic flux Fc values inside said at least two first maps (or using said at least two first maps) as a function of the operating conditions of the electrical machine EM and to determine, according to a predetermined interpolation logic, the total magnetic flux FC at the reference magnet temperature.

Similarly, the second estimation module 2*b* is configured to determine at least two known first partial flux F1 values inside said at least two second maps (or using said at least two second maps) as a function of the operating conditions of the electrical machine EM and to determine, according to a predetermined interpolation logic, the first partial flux FC value at the reference magnet temperature.

The interpolation logics are preferably determined in the pre-processing phase, according to procedures that enable the reconstruction of a first flux curve representing the total magnetic flux Fc and a second curve representing the first partial flux F1 as the magnet temperature changes and in the operating conditions of the electrical machine EM.

In the preferred embodiment, said estimation module 2*b* is also configured to determine the value of the first partial flux F1 as the difference, at the reference magnet temperature, between the value of the total magnetic flux Fc estimated as a function of the second quantity "i" and a concatenated magnetic flux value.

This first partial flux F1 value could be determined in pre-processing (or experimentally) with the construction of different maps/curves, to then be used and interpolated in real time by the estimation module 2b.

The concatenated magnetic flux value is preferably determined in pre-processing, in no-load operating conditions, and is variable as a function of the magnet temperature.

Advantageously, in this way, the total magnetic flux Fc value and the first flux F1 value are estimated as a function of different input parameters (first "v" and second quantity "i") and that take into consideration the reference magnet temperature as well.

At this point, the processing unit 2 is configured to:
c) calculate the value of the second partial flux F2 as a function of a difference between said value of the total magnetic flux Fc and said value of the first partial flux F1;
d) determine a value of a magnet temperature Tm as a function of said value of the second partial flux F2.

The second partial flux F2 thus represents the concatenated magnetic flux, defined in accordance with the above as the difference between the total magnetic flux and the reluctance flux (or first partial flux).

The processing unit 2 is, thus, associated with a map, table, or equation relating the concatenated magnetic flux to its temperature and comprises a third estimation module 2c of the magnet temperature configured to obtain said temperature from the map or table as a function of the second partial flux F2 value.

In the preferred embodiment, thus, the memory unit 4 of the electronic device 1 comprises, inside:
the first maps relating the value of the total magnetic flux Fc to a specific magnet temperature;
the second maps relating the value of the first partial flux F1 to a specific magnet temperature;
the map, table, or equation relating the concatenated magnetic flux to its temperature.

In addition, the processing unit 2 is preferably configured to:
e) update the reference magnet temperature Tr by replacing the value of said reference magnet temperature Tr with the value of the magnet temperature Tm determined in step d).

In addition, the processing unit 2 is configured to recursively perform the steps from point a) to point e).

Advantageously, in this way, the electronic device 1 operates so as to progressively get nearer the actual value of the magnet temperature, including in the absence of tools that can detect it.

The difference in the inputs of the two estimation modules 2a, 2b leads to the definition of an error that enables the estimation at each cycle of a new magnet temperature and to update, at the same time, the parameters of the estimation modules themselves, facilitating a rapid convergence with the actual value of the temperature, including starting with an initial value that is very different to it.

Advantageously, in addition, this electronic device 1 is particularly useful inside of a control system 10 of an electrical machine, which is also the subject of this invention.

This control system 10 comprises, in fact, a control device 5 of the electrical machine EM, preferably defined by an inverter controlled by a microcontroller, configured to send a control signal to the electrical machine EM according to a first quantity representing the control voltage v and a value of a current temperature of said electrical machine.

The presence of the electronic device 1 described above makes it possible to cyclically provide the updated data relating to the magnet temperature, which approximates the current temperature of said electrical machine.

The control device 5 is, thus, configured to:
update the value of said current temperature of the electrical machine, replacing it with the value of the magnet temperature Tm determined by the electronic device 1 (or determined at step d);
change the control signal according to the updated value of the current temperature.

Advantageously, this system makes it possible to significantly increase the control efficiency of the electrical machine without negatively impacting the cost and complexity of the same.

The subject of this invention is also a method implemented using a computer-implemented method to estimate the magnet temperature in an electrical machine EM.

This method is preferably implemented, but not exclusively, using the electronic device 1 described above.

We will proceed, therefore, below to describe the method in more detail, underlining that until now all the features mentioned and described in relation to the device and the system, where not expressly identified or if incompatible, are to be considered applicable mutatis mutandis to the following description of the method that is the subject of this invention.

The method involves, in the first place:
A) estimating a value of a total magnetic flux Fc of the electrical machine EM;
B) estimating a value of a first partial flux F1, representing a magnetic flux due to a reluctance of the electrical machine EM;

Step A), in accordance with the above, may be directly carried out within the method and be limited to receiving the total magnetic flux Fc value.

Step B) is preferably implemented in accordance with what is described in relation to step b) of the electronic device 1.

Thus, one preferably determines or detects a first quantity "v" representing a control voltage of the electrical machine EM and determines or detects a second quantity "i" representing a current circulating in the stator windings of the electrical machine EM.

The step for estimating the value of the total magnetic flux Fc (step A) is preferably carried out as a function of said first quantity "v", i.e., by determining the total magnetic flux Fc as a function of the control voltage and, more preferably, the measured current in the windings as well.

The step for estimating the value of the first partial flux F1 is carried out as a function of said second quantity "i", i.e., by determining the first partial flux F1 as a function of the current circulating in the windings.

There is also, preferably, a preliminary step for determining a value of a reference magnet temperature Tr.

Steps A) and B) are, thus, preferably carried out by estimating said value of the total magnetic flux Fc and said value of the first partial flux F1 with reference to said value of the reference magnet temperature Tr.

However, estimating the total magnetic flux Fc is preferably carried out as a function of the first quantity "v" and the second quantity "i" and of the reference magnet temperature Tr.

Similarly, estimating the first partial flux F1 is carried out as a function of the second quantity "i" and of the reference magnet temperature Tr.

Alternatively, the total magnetic flux and the first partial flux could be estimated as a function of other quantities and/or by inverting the input quantities (e.g., the total magnetic flux estimated as a function of the second quantity and the first partial flux estimated as a function of the first quantity).

Both the values, the total magnetic flux Fc value and the first partial flux F1 value, are preferably determined starting with the "flux maps" and according to a predetermined interpolation logic, in accordance with what has already been described in the above paragraphs, which should be consulted for more details.

It should be noted that the first partial flux F1 value is preferably determined as the difference, at the reference magnet temperature Tr, between the total magnetic flux estimated as a function of the second quantity "i" and a concatenated magnetic flux value.

According to the invention, the method also involves:
  C) calculating a value of a second partial flux F2 as a function of a difference between said value of the total magnetic flux Fc and said value of the first partial flux F1;
  D) determining a value of a magnet temperature Tm as a function of said value of the second partial flux F2.

The second partial flux F2 represents a concatenated magnetic flux, a value from which the current value of the magnet temperature (step D) can be extrapolated.

It should be noted, in this respect, that the estimate of the total magnetic flux (step A) and the estimate of the first partial flux (step B) are carried out based on inputs that are at least partially different, which leads to obtaining, at step C, a second partial flux value that is different to the concatenated magnetic flux used in the estimate of the first partial flux based on an error enabling the convergence, step-by-step, with the actual magnet temperature.

In this respect, in fact, the method also involves a step of:
  E) updating the reference magnet temperature carried out by replacing the value of the reference magnet temperature Tr with the value of the magnet temperature Tm determined in step D).

Preferably, steps A) to E) are carried out recursively, so that, at each repetition of the method, the reference magnet temperature Tr will be constantly updated, like the flux maps that are useful for estimating the same, enabling the convergence, at each step, with the current temperature value.

Based on this estimating method, is it also possible to carry out an optimised control of the electrical machine EM.

This method involves determining a value of a current magnet temperature of an electrical machine EM.

This step is, preferably, carried out by estimating or measuring an average temperature of the stator windings.

A value of a control voltage of said electrical machine EM is, thus, determined.

As a function of this control voltage and said current temperature, a control signal of the electrical machine EM is generated.

At this point, the estimating method described above makes it possible to estimate the magnet temperature (step D), whose value is used to update the value of the current temperature.

Thanks to this update, the control signal, and, thus, the control curves of the electrical machine are updated, enabling a fast convergence with values that are close to the actual magnet temperature.

The invention achieves the purposes proposed and entails significant advantages.

In fact, the arrangement of a device and a method in which the magnet temperature is estimated beginning with a modelling of the machine and based on a difference between the total machine flux and the flux attributable to the reluctance optimises and speeds up the estimate without excessively complicating the processing step.

The invention claimed is:
1. An electronic device for estimating the magnet temperature in an electrical machine including a rotor rotatable in a stator, comprising:
  a processing unit configured to:
  a) estimate a value of a total magnetic flux of the electrical machine;
  b) estimate a value of a first partial flux, representing a share of said total magnetic flux determined solely by a stator contribution;
  c) calculate a value of a second partial flux as a function of a difference between said value of the total magnetic flux and said value of the first partial flux; and
  d) determine a value of a magnet temperature as a function of said value of the second partial flux.

2. The electronic device according to claim 1, wherein said processing unit is further configured to:
  determine in advance a value of a reference magnet temperature;
  estimate the value of the total magnetic flux and the value of the first partial flux with reference to said value of the reference magnet temperature.

3. The electronic device according to claim 2, wherein said processing unit further comprises:
  a number of first maps relating the value of the total magnetic flux to a specific magnet temperature or range of magnet temperatures;
  a number of second maps relating the value of the first partial flux to a specific magnet temperature or range of magnet temperatures.

4. The electronic device according to claim 3, wherein the processing unit further comprises a first estimation module configured to:
  determine at least two known values of the total magnetic flux within at least two of said first maps as a function of operating conditions of the electrical machine;
  determine, according to a predetermined interpolation logic, a total flux value Fe at the reference magnet temperature.

5. The electronic device according to claim 3, wherein the processing unit comprises at least a second estimation module configured to:
  determine at least two known values of the first partial flux within said at least two of said first maps as a function of the operating conditions of the electrical machine;
  determine, according to a predetermined interpolation logic, the value of the first partial flux at the reference magnet temperature.

6. The electronic device according to claim 2, wherein said processing unit is further configured to:
  e) update the reference magnet temperature by replacing the value of said reference magnet temperature with the value of the magnet temperature determined in step d).

7. The electronic device according to claim 6, wherein the processing unit is further configured to recursively perform the steps from point a) to point e).

8. The electronic device according to claim 1, and further comprising:
  a detection element of a first quantity representing a control voltage of the electrical machine;

a detection element of a second quantity representing a current circulating in windings of the stator of said electrical machine, wherein the processing unit is configured to:

estimate the value of a total magnetic flux of the electrical machine at least partially as a function of said first quantity and estimate the value of the first partial flux as a function of said second quantity, or vice versa.

9. A control system for an electrical machine, comprising:

the electronic device for estimating the magnet temperature according to claim 2;

a control device of the electrical machine, configured to send a control signal to the electrical machine according to a first quantity representing a control voltage and a value of a current temperature of said electrical machine;

wherein said electronic device is configured to:

update the value of said current temperature by replacing the value of said current temperature with the value of said magnet temperature determined in step d);

change the control signal according to the updated value of the current temperature.

10. A method for estimating the magnet temperature in an electrical machine including a rotor rotatable in a stator, said method being carried out by an electronic computer and comprising the steps of:

A) estimating a value of a total magnetic flux of the electrical machine;

B) estimating a value of a first partial flux, representing a share of said total magnetic flux determined solely by a stator contribution;

C) calculating a value of a second partial flux as a function of a difference between said value of the total magnetic flux and said value of the first partial flux; and D) determining a value of a magnet temperature as a function of said value of the second partial flux.

11. The method according to claim 10, and further comprising a preliminary step of determining a value of a reference magnet temperature, wherein steps A) and B) are performed by estimating said value of the total magnetic flux and said value of the first partial flux with reference to said value of the reference magnet temperature.

12. The method according to claim 11, and further comprising a step for updating the reference magnet temperature carried out by replacing the value of the reference magnet temperature with the value of the magnet temperature determined in step D).

13. The method according to claim 10, wherein steps A) to D) are performed recursively.

14. The method according to claim 10, and further comprising the steps of:

determining or detecting a first quantity representing a control voltage of the electrical machine;

determining or detecting a second quantity representing a current circulating in windings of the stator of said electrical machine, wherein the estimation of the value of the total magnetic flux is at least partly carried out as a function of said first quantity and the estimation of the value of the first partial flux is carried out as a function of said second quantity, or vice versa.

15. A control method for the electrical machine comprising the steps of:

determining a value of a current magnet temperature of an electrical machine;

determining a value of a control voltage of an electrical machine;

generating a control signal of said electrical machine according to said value of the control voltage and said value of the current temperature;

estimating a value of a magnet temperature of said electrical machine by implementing the method according to claim 10;

updating the value of the current temperature by replacing the value of the current temperature with the value of said magnet temperature determined in step D); and changing the control signal according to the updated value of the current, updated temperature.

* * * * *